Feb. 23, 1932.  G. M. NELL  1,846,568
BLOWING DEVICE FOR LUGGED DRILL STEELS
Filed May 4, 1929
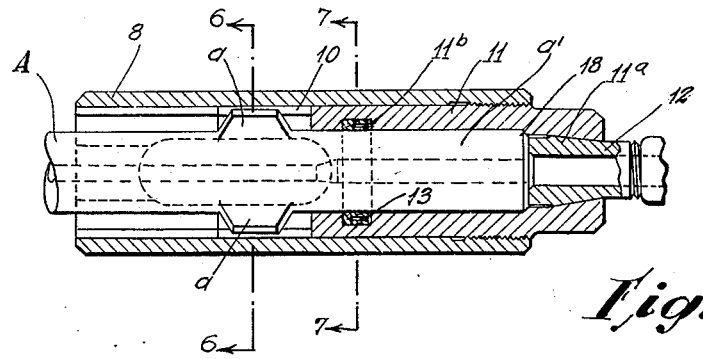
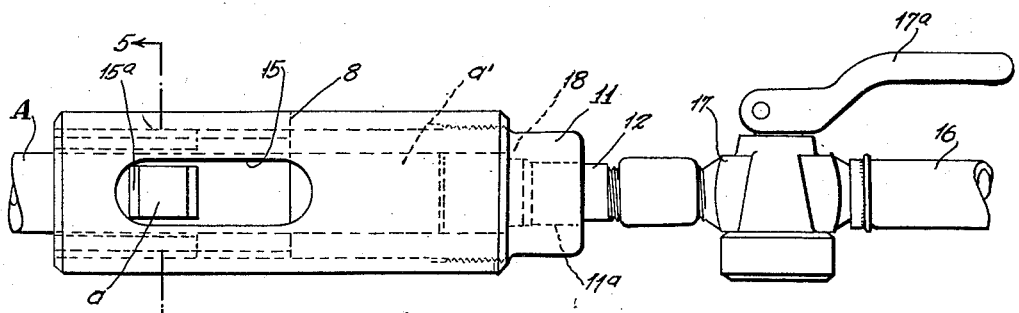
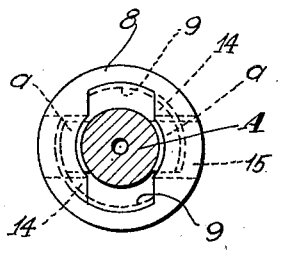 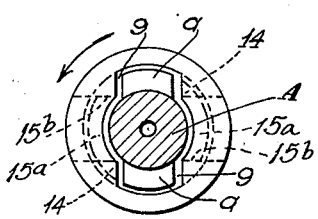 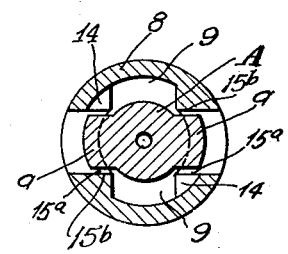
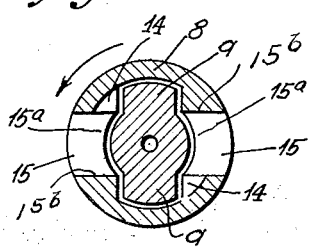 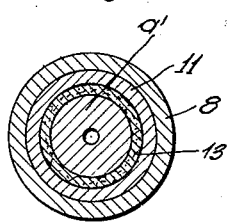
INVENTOR.
Gustave M. Nell
BY
Ira L. Nickerson
ATTORNEY.

Patented Feb. 23, 1932

1,846,568

UNITED STATES PATENT OFFICE

GUSTAVE M. NELL, OF DETROIT, MICHIGAN, ASSIGNOR TO CHICAGO PNEUMATIC TOOL COMPANY, OF NEW YORK, N. Y., A CORPORATION OF NEW JERSEY

BLOWING DEVICE FOR LUGGED DRILL STEELS

Application filed May 4, 1929. Serial No. 360,596.

This invention relates to apparatus for utilizing motive fluid such as compressed air for clearing drill holes of cuttings and detritus in mining, quarrying, and similar operations.

One object of the invention is to provide a simple but safe and easily operated device for ejecting cuttings from deep drill holes by using the drill steel itself and thus obviating the necessity of inserting a pipe into the hole. Other objects will be apparent from the detained description which follows.

In order to illustrate the invention, one concrete embodiment thereof is shown in the accompanying drawings, in which:

Fig. 1 is a side elevational view showing the blowing attachment in use on a drill steel;

Fig. 2 is a sectional view through the attachment with the throttle valve omitted and showing the shank of the drill steel in elevation in the position of initial insertion;

Fig. 3 is a left end elevational view of the parts shown in Fig. 1, the drill steel being shown in section;

Fig. 4 is a right end elevational view of the parts shown in Fig. 2 with the drill steel in section;

Fig. 5 is a transverse sectional view substantially on the line 5—5 of Fig. 1;

Fig. 6 is a transverse sectional view substantially on the line 6—6 of Fig. 2; and Fig. 7 is a transverse sectional view on the line 7—7 of Fig. 2.

The invention comprises a device adapted for quick attachment to and detachment from a hollow drill steel such as A which is provided with the usual opposed lugs $a$. The device comprises a cylindrical member 8 having longitudinal grooves 9 for slidably receiving the lugs $a$ of the drill steel. The rearward portion of the cylinder 8 is counterbored as indicated at 10 and a bushing 11 is threaded into the counterbored portion and receives the shank $a'$ of the drill steel. The opening through the end of bushing 11 is tapered at 11a to receive a similarly tapered pipe connection 12, thereby providing a swivel joint. An annular groove 11b on the interior of bushing 11 is utilized for a folded expansible packing or washer 13 which engages the shank $a'$ of the steel and prevents leakage of pressure fluid therealong. The interior bore of cylinder 8 is arranged adjacent bushing 11 to provide a bayonet connection with lugs $a$ of the drill steel. To this end the ribs between the grooves 9 are cut away at diametrically opposite points 14 (Figs. 3–6 inclusive) and diametrically opposed openings or slots 15 are provided in cylinder 8 forming stop shoulders 15a for engagement by lugs $a$ of the drill steel. Intermediate swivel pipe connection 12 and the flexible air pipe 16, a throttle valve 17 is provided with an operating handle 17a.

In using the device the operator grasps the throttle valve in one hand and cylinder 8 in the other and telescopes the latter over the shank end of the hollow drill steel, the lugs $a$ entering the axial grooves 9 in the interior of the cylinder. This telescoping movement is stopped when the shank end of the drill steel strikes an interior shoulder 18 in bushing 11 or when the lugs strike the inner end of bushing 11. Since the pressure fluid is shut off at the throttle valve, there is no pressure on swivel 9 so that the assembled attachment as a unit is readily turned in the direction indicated by the arrow in Fig. 4 until lugs $a$ engage stops 15b formed by the uncut portions of the ribs between grooves 9. In this position, lugs $a$ are over the stop shoulders 15a to make a bayonet lock. With the parts thus locked, as the operator may observe through openings 15, throttle handle 17a is turned to open position whereupon fluid under pressure will cause the attachment as a whole to assume the position indicated in Fig. 1, with the lugs in direct contact with stop shoulders 15a and the motive fluid will pass into the drill hole through the bore of the hollow drill steel. With the motive fluid turned on, the swivel connection will be held by the pressure of the fluid and by friction tightly on its seat preventing turning of the attachment on the steel. In this position, so long as the air is on, it is impossible for the device to blow off the drill steel and a very difficult matter to remove it until the air is shut off. With the air shut off, a reverse turn will disconnect the bayonet lock and the attachment may be easily removed. The swivel permits the turning of the attachment to engage the bayonet lock without having to turn or twist the air hose 16.

While the invention has been herein disclosed in what is now considered to be a preferred form, it is to be understood that it is not limited to the specific details thereof but covers all changes, modifications, and adaptations within the scope of the appended claims.

I claim as my invention:

1. A blowing attachment for lugged drill steels comprising a cylinder having internal grooves adjacent one end slidable to receive the lugs of the drill steel, a bushing secured in the other end of said cylinder to receive the shank of the steel, a pressure fluid conduit having a swivel connection with said bushing, and means in said bushing for preventing the escape of pressure fluid along the shank of the steel.

2. A blowing attachment for lugged drill steels comprising a cylinder having internal grooves adjacent one end slidably to receive the lugs of the drill steel, a bushing secured in the other end of said cylinder to receive the shank of the steel, a pressure fluid conduit having a swivel connection with said bushing, said bushing having an annular groove in its interior transverse to the axis thereof, and packing means in said groove.

3. A blowing attachment for lugged drill steels comprising a cylinder having internal grooves adjacent one end slidably to receive the lugs of the drill steel, a bushing secured in the other end of said cylinder to receive the shank of the steel, a pressure fluid conduit having a swivel connection with said bushing, said bushing having an annular groove in its interior transverse to the axis thereof, and an expansible packing member in said groove having an annular opening toward said fluid conduit.

4. A blowing attachment for lugged drill steels comprising a cylinder having internal grooves adjacent one end slidably to receive the lugs of the drill steel, a bushing secured in the other end of said cylinder to receive the shank of the steel, and a fluid pressure conduit having a swivel connection with said bushing.

5. A blowing attachment for lugged drill steels comprising a cylinder having internal ribs providing axial grooves for receiving the lugs of the drill steel when the same is telescoped thereover, the other end of said cylinder being counterbored and having a bushing secured therein for receiving the shank of the drill steel, said ribs being cut away adjacent the inner end of said bushing to permit a partial rotation of the steel and to provide stop shoulders forming a bayonet lock, expansible packing means in said bushing for engagement with the steel shank, and a swivel connection on said bushing for a fluid pressure conduit.

Signed by me at Detroit, in the county of Wayne, and State of Michigan this 27 day of April, 1929.

GUSTAVE M. NELL.